(12) United States Patent
Mabey et al.

(10) Patent No.: US 9,453,116 B2
(45) Date of Patent: Sep. 27, 2016

(54) LOW-TEMPERATURE INTUMESCENT FIRE RETARDANT

(75) Inventors: Michael John Mabey, Sherwood Park (CA); William Kish, Wadsworth, OH (US)

(73) Assignee: No-Burn Investments, L.L.C., Wadsworth, OH (US)

( * ) Notice: Subject to any disclaimer, the term of this patent is extended or adjusted under 35 U.S.C. 154(b) by 814 days.

(21) Appl. No.: 12/586,472

(22) Filed: Sep. 22, 2009

(65) Prior Publication Data

US 2010/0076098 A1 Mar. 25, 2010

Related U.S. Application Data

(60) Provisional application No. 61/194,203, filed on Sep. 25, 2008.

(51) Int. Cl.
| | |
|---|---|
| C09D 5/00 | (2006.01) |
| C09D 5/18 | (2006.01) |
| C08J 9/36 | (2006.01) |
| C09D 5/02 | (2006.01) |
| C08K 3/32 | (2006.01) |

(52) U.S. Cl.
CPC ............... *C08J 9/365* (2013.01); *C09D 5/024* (2013.01); *C09D 5/185* (2013.01); *C08J 2431/00* (2013.01); *C08K 3/32* (2013.01)

(58) Field of Classification Search
USPC .......................................................... 521/85
See application file for complete search history.

(56) References Cited

U.S. PATENT DOCUMENTS

| | | | |
|---|---|---|---|
| 3,404,061 A | 10/1968 | Shane et al. | 161/125 |
| 5,176,863 A | 1/1993 | Howard | 264/113 |
| 5,443,894 A | 8/1995 | Pollock et al. | 428/213 |
| 6,245,842 B1 * | 6/2001 | Buxton et al. | 524/101 |
| 6,460,310 B1 | 10/2002 | Ford et al. | 52/729.1 |
| 6,669,919 B1 | 12/2003 | Greinke | 423/448 |
| 7,482,395 B2 | 1/2009 | Mabey et al. | 523/122 |
| 7,587,875 B2 | 9/2009 | Kish et al. | 52/745.05 |
| 2005/0022466 A1 | 2/2005 | Kish et al. | 52/741.3 |
| 2005/0138888 A1 | 6/2005 | Kish et al. | 52/741.3 |
| 2006/0167131 A1 * | 7/2006 | Mabey et al. | 523/122 |

FOREIGN PATENT DOCUMENTS

| WO | WO 91/11498 | * | 1/1991 | |
|---|---|---|---|---|
| WO | WO 2006/005716 | * | 1/2006 | C08G 59/54 |

OTHER PUBLICATIONS

The American Heritage Dictionary Definition of "Paint." Houghton Mifflin Company. Fourth Edition. 2000.*
Mabey et al., U.S. Appl. No. 61/194,203, filed Sep. 25, 2008.
GrafTech International Ltd., Other Industries, 2007, p. 1 of 1 (www.graftech.com/ . . . ) downloaded Sep. 21, 2009.
GrafTech International Holdings Inc., GRAFGUARD® Patents, 2008, p. 1 of 1 (www.graftechaet.com/ . . . ), downloaded Sep. 21, 2009.
Advanced Energy Technology Inc., GRAFGUARD® Expandable Graphite Flake, Technical Bulletin 226, Jul. 20, 2006, 2 pages.
Chung, L., Elert, G. (Ed.), The Physics Factbook, "Ignition Temperature of Paper," hypertextbook.com, 2 pp., 2003, downloaded Nov. 2, 2011 A.D.
SinoHarvest, Products, "Ammonium Polyphosphate," www.sinoharvest.com, 3 pp., 2011, downloaded Nov. 2, 2011 A.D.

* cited by examiner

*Primary Examiner* — Kara Boyle
(74) *Attorney, Agent, or Firm* — Christopher John Rudy

(57) ABSTRACT

Composition embraces a fire retardant coating formulation that intumesces at a low temperature. The composition can be in a form of a paint, for instance, having as a primary fire retardant ingredient an ammonium phosphate and also having as a low-temperature intumescent agent an expandable graphite powder or flake. A temperature of intumescence can be substantially below 204.4° C. (400° F.) or thereabout, and it may have more than one temperature of intumescence. Such a composition can be made by contacting a fire retardant formulation, optionally with another active agent, with a low-temperature intumescencent agent under conditions sufficient to form the composition; it can be used by contacting it with a substrate, which may be otherwise flammable. Another aspect is the composition or its residue in combination with the substrate.

2 Claims, 1 Drawing Sheet

COMPARATIVE

LOW-TEMPERATURE INTUMESCENT FIRE RETARDANT

Figure 1:
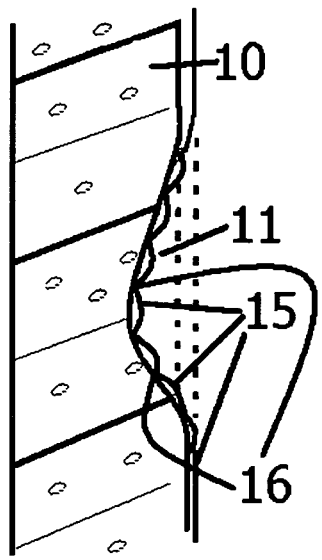

This claims the benefits under 35 USC 119(e) of provisional patent application No. U.S. 61/194,203 filed on Sep. 25, 2008 A.D. The complete specification of that application, to include its drawings, is incorporated herein by reference.

FIELD AND PURVIEW OF THE INVENTION

This concerns a composition embracing a fire retardant coating formulation that includes intumescence at a low temperature. The composition may be, say, a paint or stain, for example, a latex paint. A temperature of intumescence can be substantially below 204.4° C. (400° F.) or thereabout. Of concern also are methods to make and use the composition, and a substrate in combination with the composition or residue whereof.

BACKGROUND TO THE INVENTION

Various fire retardant compositions are known. Certain of these can be in a form of an intumescent coating, which may be a paint. A highly effective fire retardant intumescent latex paint is commercially available from No-Burn, Inc., Wadsworth, Ohio as NO-BURN® PLUS product. This can be employed, for example, in residential and commercial structures including homes to provide fire resistant properties to the structure. Compare, patent application Pub. Nos. US 2005/0138888 A1 and US 2005/0022466 A1 and U.S. Pat. No. 7,587,875 (Form #2 Agent). Note, patent application Pub. No. US 2006/0167131 A1 and U.S. Pat. No. 7,482,385 B2.

Generally, intumescent fire retardant products, particularly those which employ a fire retardant ingredient such as an ammonium phosphate, say, in a form of a coating, for example, a latex paint, when suitably applied and dried on a flammable substrate, for example, wood, intumesce at a temperature suitable for retarding the spread of a fire but above a temperature at which intumescence would occur where there is no fire, for example, in a confined attic space. Such a temperature may be about 204.4° C. (400° F.).

Modern construction materials include foams, for instance, closed cell foams made from organic polymers such as polystyrene, polyurethane, and so forth. Making such materials fire retardant is, of course, a concern. Some have some fire retardant capacity from added intrinsic ingredients such as organic phosphorus flame retardant compositions. That capacity may not be enough to satisfy the demands of the modern community, and so, sometimes an intumescent fire retardant coating product is applied to such a foam. Adequate or expected fire retardant capability, however, does not necessarily, and often does not, follow.

Also, GRAFGUARD® expandable graphite flake commercially available from GrafTech International, Lakewood, Ohio is an intumescent material that may be considered for use as a fire retardant additive in certain plastics, foams, putties and coatings. According to trade literature, one of the grades of GRAFGUARD® expandable graphite flake is reported to have an onset temperature of 160° C. (320° F.) and be typically used in intumescent putties, sealants and mats, or fire retardant foams for building insulation and transportation seating. Compare, U.S. Pat. Nos. 3,404,061; 5,176,863 and 5,443,894; and U.S. Pat. Nos. 6,460,310 B1 and 6,669,919 B1.

Still, formulation and compatibility of ingredients may not always be straightforward.

It would be desirable to improve the art. It would be desirable to ameliorate if not solve one or more of the problems in the art. It would be desirable to provide an alternative to the art.

A FULL DISCLOSURE OF THE INVENTION

In general, provided is a composition comprising a fire retardant coating formulation that has intumescence at a low temperature. A temperature of intumescence can be substantially below 204.4° C. (400° F.) or thereabout. Such can be made by a method comprising contacting a fire retardant formulation, with a low-temperature intumescencent agent under conditions sufficient to form the composition; it can be used by contacting it with a substrate, which may be otherwise flammable. Another aspect is the composition or its residue in combination with the substrate.

The invention is useful to protect buildings and their components and contents from fire.

Significantly, by the invention, the art is advanced in kind. Problem(s) in the art is(are) ameliorated if not overcome. An effective, cost-efficient, aesthetically pleasing and/or generally safe fire retardant providing low-temperature intumescence is provided. Applications may be made on construction foams and effectively enhance or provide fire retardant capability. Application of the coating as, for example, a paint, is simple and easy, and coverage can be excellent. The composition can advantageously be applied directly to a wide range of materials, including structural plastic foams and spray-applied insulating foams; also, it may be applied to wood, plywood, oriented strand board and chip board sheathing, paper, fabrics, corrugated board materials, and so forth and the like. It is efficient and reasonably safe to manufacture, store, transport and use. One of the many advantages of the present composition is that, since it can be applied directly to building materials before or on site, it greatly reduces financial and environmental costs in new structures of rendering materials fire retardant. Further, building materials may be rendered fire retardant after construction by application of the present composition. In one embodiment, the composition may be considered to be a highly durable intumescent fire retardant latex paint with a low temperature of intumescence suitable for coating a variety of foam substrates, which can provide these properties at once through a common application of a beautiful, durable water-based paint. The present composition may have a "Class A" flame spread rating under ASTM-E84 testing.

Numerous further advantages attend the invention.

The drawings form part of the specification hereof. With respect to the drawings, which are not necessarily drawn to scale, the following is briefly noted:

FIG. 1, a comparative figure, is a sectional side view of a closed cell structural foam coated with an intumescent fire retardant paint that intumesces only at about 204.4° C. (400° F.) or above, after a fire source is applied.

Figure 2:
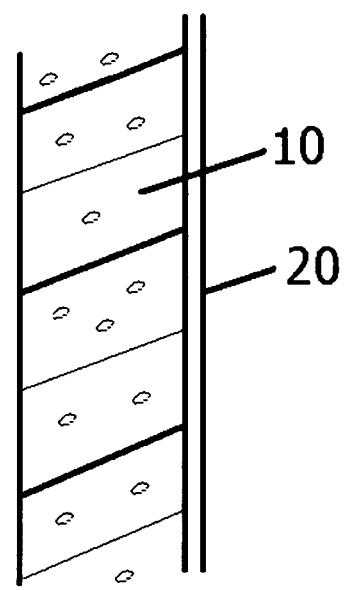

FIG. 2 is a sectional side view of a closed cell structural foam as in FIG. 1 coated with a fire retardant paint that intumesces at a low temperature substantially below 204.4° C. (400° F.) or thereabout after a fire source as in FIG. 1 is applied.

The invention can be further understood by the additional detail set forth below. The same, like that set forth above, is to be taken in an illustrative and not necessarily limiting sense.

Broadly, a fire retardant formulation is provided with low-temperature intumescence. An intumescent fire retardant paint, which in one embodiment may be an aqueous based latex paint, may include as an ingredient a low-temperature intumescent agent.

The term, "fire retardant," herein can refer to an ingredient for a composition or to the composition, which may be a coating, for instance, a paint, which when applied to a flammable material, provides a measure of thermal protection for the material. In general, this may be done by reducing or perhaps even eliminating the tendency of the material to burn and/or reducing the rate of flame spread along the surface of the material. Preferably, use of the fire retardant composition, for example, on a solid material as the substrate, reduces surface burning characteristics significantly, say, at least about 10%, at least about 25%, or at least about 50%, when compared to untreated material, as tested by an appropriate test. For example, the test may be the ASTM E84 Steiner Tunnel Test. Without being bound by any theory, the present fire retardant paint can be considered to be an intumescent fire reactant. Although it looks and applies like regular paint, its chemical composition changes drastically when introduced to heat. Thus, when heat is applied, the fire retardant paint of the invention may "foam up" to form an intact, fire-resistive "char-barrier" to protect the treated surface. As a result, fire is robbed of fuel and oxygen, generates less heat and smoke, and may in some circumstances extinguish itself.

Any suitable fire retardant ingredient may be employed. For instance, such an ingredient as a substantial ingredient may be an ammonium phosphate, a borate, an organic halide such as a chloride or generally more effectively a bromide or combination of chloride and bromide, an organophosphorus compound, which may be an organic phosphate, to include melamine phosphates such as melamine phosphate, melamine orthophosphate, dimelamine phosphate, dimelamine orthophosphate, melamine pyrophosphate, melamine polyphosphate, blends therewith, and so forth. Melamine and/or melamine cyanyurate may be employed. In general, depending on the form of the composition, the ammonium phosphate may embrace a mono- and/or di-ammonium phosphate, a polyphosphate, and so forth and the like. For example, it may be or include an ammonium polyphosphate, as would be suitable for the form of a latex paint.

"Low temperature," in general, with respect to intumescence, herein refers to a temperature substantially below 204.4° C. (400° F.) or substantially below about 204,4° C. (400° F.). In determining the temperature of the low-temperature intumescence, the environment plays its part as does the substrate to which the low-temperature intumescent fire retardant composition is applied. Thus, a closed cell construction foam or other flammable material for building construction may be applied in a confined, concealed portion of the building structure, say, in an attic of a residence, or it may be applied as an exterior underlayment or substrate. The temperature of intumescence may be about 200° C. (392° F.) or below; about 180° C. (356° F.) or below; about 176.7° C. (350° F.) or below; about 149° C. (300° F.) or below; or about 121° C. (250° F.) or below. Any suitable minimum temperature for low-temperature intumescence, which, for instance, in general, can protect a substrate such as foam from collapse under fire conditions, may be encountered. Advantageously, however, a minimum temperature for the low-temperature intumescence is established such that the composition, when suitably applied and dried, does not intumesce at a temperature where there is no fire or imminent threat of fire, The minimum temperature may be about 140° C. (284° F.) or above; about 150° C. (302° F.) or above; and so forth. The low-temperature intumescence may occur, independently at each occurrence, about from 140° C. (284° F.) to about 200° C. (392° F.), for instance, about from 150° C. (302° F.), to include about 160° C. (320° F.). The intumescing may be from 160° C. (320° F.) or 180° C. (356° F.) to 200° C. (92° F.) or thereabout, or 180° C. (356° F.) or thereabout or less, or any suitable temperature necessary to pass an ASTM E-119 fire test, say, with a plastic foam substrate, since many foamed plastics otherwise shrink or collapse at 180° C. (356° F.). Additionally, intumescing may occur about 250° C. (482° F.) or below, about 300° C. (572° F.) or below, about 350° C. (662° F.) or below, and substantially below 400° C. (752° F.) or thereabout, with upper ranges of these themselves, of course, not being low temperature intumescing. A fire retardant composition may have two or more temperatures of intumescing, and, so long as at least one of them is the low temperature, be a fire retardant that intumesces at low temperature. As an illustration, a fire retardant paint may intumesce at about 160° C. (320° F.) and about 204.4° C. (400° F.) and have low-temperature intumescent properties.

Any suitable low-temperature intumescent agent may be employed to provide the fire retardant composition that intumesces at low temperature. For instance, it may embrace, in general, as another ingredient, a low-temperature intumescent such as of or including expandable graphite, say, an acid treated or intercalated graphite, which may be in the form of a flake or powder. For instance, GRAF-GUARD® expandable graphite flake or another intumescent, expandable graphite flake or powder may be employed, especially after the graphite is treated with acid(s). Generally, a grade of sufficiently reactive graphite to protect the surface of a plastic foam from collapse and produce the desired intumescent reaction may be employed.

A low-temperature intumescent agent may be considered a fire retardant ingredient.

Any suitable amount of the low-temperature intumescent agent may be employed. For instance, amounts of the agent with respect to amount of the composition as a liquid before addition of the agent, may be, independently at each occurrence, in a ratio by weight of agent to other part of composition about 1:5; 1:10; 1:15; 1:20; 1:22; 1:23; 1:24; 1:26; 1:30; 1:35; 1:40 or 1:50, or any range employing any of such ratios as a lower and/or upper value. To illustrate, about 100 g of GRAFGUARD® expandable graphite flake or another expandable graphite flake or powder, intercalated with acid, may be added to about five (5) pounds (about 2270 g) of NO-BURN® PLUS intumescent fire retardant latex paint, and mixed, to modify such a commercially available paint product, which may provide a fire retardant that intumesces at low temperature.

Fire retardant paint formulations can vary. For example, a base latex formulation may include ingredients added with water, in percentages, which may be considered approximate, as follows:

| | |
|---|---|
| Ammonium phosphate solids, e.g., ammonium phosphate powder | 10 to 40% by weight |
| Thermoplastic latex resin, e.g., polyvinyl acetate type | 5 to 30% by weight |
| Nitrogenous spumific, e.g., melamine powder | 5 to 15% by weight |
| Carbonific, e.g., polyol | 5 to 15% by weight |
| Generally inert pigment(s) and/or filler(s), e.g., powdered titanium dioxide | 5 to 10% by weight |

-continued

| | |
|---|---|
| Soda lime borosilicate or other glass | 1 to 5% by weight |
| Ester alcohol | 0.5 to 1.5% by weight |
| Hydroxyalkylcellulosic | 0.1 to 1% by weight |
| Wetting and/or other agent(s) | 0.1 to 5% by weight. |

As the nitrogenous spumific, any suitable hydrogen-containing nitrogenous organic compound may be employed. Preferably, the spumific is compatible with the other components employed, and further is dispersible therewith. For instance, melamine may be employed.

As the carbonific, any suitable hydroxyl-containing organic compound may be employed. Preferably, the carbonific is compatible with the other components employed, and further is dispersible in the water or other diluent employed. For instance, a polyol may be employed. The polyol may be a compound such as glycerol, pentaerythritol, dipentaerythritol, tripentaerythritol; a sugar, say, a monosaccharide such as a triose, tetrose, pentose, hexose, heptose, or octose, to include an aldose or a ketose, or a disaccharide, a trisaccharide, a polysaccharide, and so forth; and/or a starch. A combination of polyols may be employed. Pentaerythritol is a preferred selection in the latex formulation.

Any suitable generally inert pigment(s) and/or filler(s) may be employed, and an opacifying agent may be included with such. A titanium dioxide powder may be selected as the opacifying agent. A calcium carbonate may be employed. Tint(s) and/or color(s) may be added to obtain a pastel or colored paint.

A glass additive such as borosilicate and/or other glass may be provided, preferably in the form of glass bubbles of a size in the range of a powder. This improves the body of the paint, and may provide it with thixotropic or other advantageous viscous flow properties and also improve the thermal resistance of the final product.

As the ester alcohol, any suitable ester alcohol may be employed. The ester alcohol may be an alkanol alkylate, for example, 2,2,4-trimethyl-1,3-pentanediol monoisubutyrate. The ester alcohol functions as a coalescent for film integrity, and so forth.

As the hydroxyalkylcellulosic, any hydroxyalkylcellulose or suitable analog or derivative thereof may be employed. It may be hydroxymethylcellulose or hydroxyethylcellulose, preferably the latter. The hydroxyalkylcellulosic functions to improve the flow and rheology of the finished paint solution or suspension, reducing sag and improving film build.

Wetting and/or other agent(s) may be employed. Such agent(s) can include what may be considered surface tension lowering agents, surfactants, defoaming agents, dispersing agents, paint preservatives, which may be biocidal, and so forth and the like. Thus employed in minor amounts may be a pigment dispersing agent such as an alkali metal salt of a polymeric carboxylic acid, say, the sodium salt of a copolymer of maleic acid; a defoamer colloid such as an acrylic polymer, say, sodium polyacrylate; a silicone surfactant such as a polyether modified alkyl polysiloxane, say, a polyether modified poly-dimethyl-siloxane, which may be employed neat or preferably in solution with a suitable solvent, say, about half dipropyleneglycol monomethyl ether (48%); a paint preservative/biocide such as containing 1,2-benzisothiazol-3(2H)-one, say, as an aqueous mixture containing 1,2-benzisothiazol-3(2H)-one, sodium hydroxide, and dipropyleneglycol; and a rheology modifier such as a hydrophobically modified ethylene oxide urethane block copolymer, which may be employed in an organic solvent mixture such as a mixture of butyl carbitol and water or without the organic solvent, say, in water only. A pH adjuster and/or buffer may be employed.

A foundational fire retardant solvent or oil based paint formulation may include its ingredients such as follows, which may be considered to be approximate:

Primary solvent, for instance, an aromatic organic liquid or blend thereof, say, low odor mineral spirits (LOMS) and/or xylene, e.g., 50% LOMS and 50% xylene 20 to 50% by weight Secondary solvent, which may act as a carbonific, a suitable hydroxyl-containing organic compound compatible and dispersible with the other ingredients, for instance, a polyol, say, a glycol ether or polyoxyalkylene composition, e.g., DOWANOL® DPM dipropylene glycol methyl ether 2 to 10% by weight First film forming agent or polymer, for instance, a (vinyl aromatic)-acrylic, say, a vinyl toluene-acrylate and/or substituted vinyl toluene-acrylate resin, which may, owing to its(their) burn characteristics, enhance intumescence, e.g., PLIOLITE® VTAC-L vinyl toluene-acrylate Newtonian low viscosity resin 5 to 15% by weight Second film forming agent or polymer, for instance, another (vinyl aromatic)-acrylic, say, a styrene-acrylate and/or substituted styrene-acrylate resin, which also may, owing to its(their) burn characteristics, enhance intumescence, e.g., PLIOLITE® AC80 Newtonian and/or AC4 thixotropic styrene-acrylate resin(s) 1 to 5% by weight Fire retardant wax, for instance, a halogenated paraffin, especially a short chain chlorinated paraffin, e.g., CHLOROWAX® 70 powder 3 to 10% by weight Nitrogenous spumific, a suitable hydrogen-containing nitrogenous organic compound compatible and dispersible with the other ingredients, for instance, a melamine powder, e.g., MELAFINE® powder 3 to 10% by weight Carbonific, for instance, a carbonaceous compound, say, a polyol such as pentaerythritol and so forth, e.g., Hercules Aqualon improved technical PE-200 3 to 10% by weight Ammonium phosphate, for instance, an ammonium polyphosphate, especially a largely water insoluble ammonium polyphosphate, e.g., EXOLIT® AP 422 fine particle ammonium polyphosphate 10 to 30% by weight Generally inert fillers and pigments, say, an inorganic opacifying agent such as calcium carbonate, and so forth, e.g., titanium dioxide powder, with which may include suitable colorant(s) 5 to 15% by weight.

To such a base fire retardant latex or oil based paint can be added the low-temperature intumescent agent. For instance, the GRAFGUARD® expandable graphite flake, say, intercalated with acid, may be added to the base fire retardant latex paint formulation at a ratio between about 1:20 to 1:26 by weight, say, at about 1:23 by weight.

Other additive(s), if suitable for the composition, perhaps may be employed.

With respect to FIG. 1, the comparative figure, a closed cell structural foam is coated with an intumescent fire retardant paint that intumesces only at about 204.4° C. (400° F.) or above, after a fire source is applied. The foam 10 melts to form cavity 11. The intumescent coating 15 may move or shrink with the melting, but regions of compromise 16 may be found as cracks, voids, cavities or holes, leaving portions of the foam 10 exposed, through which fire may develop. This is explained in that many foamed plastic products tend to melt at a critical melting point that is lower than the reaction temperature of the intumescent coating 15. Thus, such a foam 10 tends to shrink back from the original surface when heated to temperatures that are substantially lower than the temperature needed to initiate the intumescent action of a fire retardant paint or coating such as the intumescent coating 15, which may be commercially available. This tendency to shrink under fire conditions results in a failure of the fire retardant paint or coating 15, which does not necessarily fully conform to the new, greater surface of the foam 10 that has shrunk back, to protect the new surface of the foam 10 when shrunk back from ignition and flame spread. Thus, the coating 15 proves ineffective at protecting the foam 10.

With respect to FIG. 2, a closed cell structural foam as in FIG. 1 is coated with a fire retardant paint that intumesces at a low temperature substantially below 204.4° C. (400° F.) or thereabout after a fire source as in FIG. 1 is applied. The foam 10 is not melted. The low-temperature intumescent coating 20 intumesces to protect the underlying foam from heat so that it much more effectively resists development of fire. It effectively deflects heat. This is because the present coating 20 reacts to heat and intumesces to form a protective intumescent layer at a significantly lower temperature than the critical melting point of the foam 10. In general, the surface does not move because the foam 10 does not shrink back, and the intumescent layer from the coating 20 remains intact, having had foamed to deflect the heat before the foam 10 could melt and move.

The present composition, especially as a stain or paint, may penetrate to a degree, say, a small amount. It may reside substantially on the surface of a substrate. However that may be, once dried, as a paint it would typically leave a generally opaque film on the surface of a solid substrate, which may be flammable, although more than one coat may be needed to completely cover. There may be nothing in the composition known to be substantially harmful to plastic structural or insulating foam, wood per se, plywood, another wood product, or paper of gypsum board, in general. Further, since the composition is typically applied on the surface, it should not interact with, degrade, or otherwise deteriorate foam, or plywood, sheathing, other types of glued or composite wood products, or paper-clad or paper products, particularly deep in the substrate.

The present composition may be applied to the materials by any suitable method. Known methods may be employed. A paint or other suitable coating may be applied by spraying, say, by hand-held trigger sprayers, pump-up pressure sprayers, or any other type of manual or automatic power-assisted spraying apparatus, including by power paint rollers (saturated rollers); airless sprayers; brushing; dipping; and so forth. Advantageously, the wet paint is applied by spraying. Brushing is a simple, effective expedient. These and other application processes are well known in the art and are subject to many variations. The composition of the present invention is applied at any suitable concentration or rate to produce a material treated with an effective amount of the same.

The following examples further illustrate the invention.

EXAMPLE 1

Four (4) kilograms of NO-BURN® PLUS ammonium polyphosphate containing fire retardant intumescent latex paint is blended with eighty (80) grams of commercially available acid treated GRAFGUARD® expandable graphite flake, gxade 160-50N (temperature of onset of expansion of 160° C. (320° F); 50-mesh particle size, 65% on 50-mesh nominal; and neutral surface chemistry, pH 5-8.5) that is treated by GrafTech with sulfuric and nitric acid, and is delivered ready to use. The combination is mixed to an even distribution and a smooth texture to provide a fire retardant coating formulation that intumesces at a low temperature in a form of a latex paint.

EXAMPLE 2

A sample of the product of Example 1 is applied to a sheet of FOAMULAR® rigid panel closed cell board plastic foam insulating sheathing from Owens Corning, and is allowed to dry. The coated foam is subjected to an open flame from a propane torch and is estimated to have intumescence about from 160° C. (320° F) to 200° C. (392° F). The intumescent action is sufficient to protect the foamed plastic substrate from the heat of the torch and prevent the surface of the foam from collapsing under the painted surface before char protection is present. Thus, the intumescent char pillow is sufficient to delay combustion of the foamed plastic substrate and offer a substantially reduced flame spread rating and smoke developed rating.

CONCLUSION TO THE INVENTION

The present invention is thus provided. Various feature(s), part(s), step(s), subcombination(s) and/or combination(s) may be employed with or without reference to other feature (s), part(s), step(s), subcombination(s) and/or combination (s) in the practice of the invention, and numerous adaptations and modifications can be effected within its spirit, the literal claim scope of which is particularly pointed out as follows:

The invention claimed is:

1. A composition of matter comprising a fire retardant coating formulation in a form of a solvent or oil based paint having a fire retardant ingredient with a low-temperature intumescent agent, which intumesces at a temperature about 180° C. (356° F.) or below, which composition has a foundational fire retardant paint formulation that includes ingredients by weight as follows:
   Primary solvent of an aromatic organic liquid or blend thereof about from 20% to 50%
   Secondary solvent, which acts as a carbonific and is an organic polyol compatible and dispersible with the other ingredients about from 2% to 10%
   First film forming agent of a (vinyl aromatic)-acrylic polymer about from 5% to 15%
   Second film forming agent of another (vinyl aromatic)-acrylic polymer different from the first film forming agent, which enhances intumesce about from 1% to 5%
   Fire retardant wax of a halogenated paraffin about from 3% to 10%
   Nitrogenous spumific of a hydrogen-containing nitrogenous organic compound compatible and dispersible with the other ingredients about from 3% to 10%
   Carbonific of carbonaceous polyol compound about from 3% to 10%
   An ammonium polyphosphate about from 10% to 30%
   Generally inert filler of an inorganic opacifying agent, optionally with colorant about from 5% to 15%, to which foundational formulation is added the low-temperature intumescent agent.

2. The composition of claim 1, wherein the primary solvent is low odor mineral spirits (LOMS) and/or xylene;

the secondary solvent is a glycol ether or polyoxyalkylene composition; the first film forming agent is a Newtonian low viscosity vinyl toluene-acrylate and/or substituted vinyl toluene-acrylate resin: the second film forming agent is a Newtonian or thixotropic acrylate and/or substituted styrene-acrylate resin; the fire retardant wax is a short chain chlorinated paraffin; the nitrogenous spumific is a melamine powder; the carbonific is a pentaerythritol; the ammonium polyphosphate is fine-particle and largely water insoluble; the generally inert filler includes calcium carbonate and/or titanium dioxide powder; and the low-temperature intumescent agent is an expandable graphite.

* * * * *